(12) United States Patent
Peris Domingo et al.

(10) Patent No.: US 9,239,172 B2
(45) Date of Patent: Jan. 19, 2016

(54) SOLAR CONCENTRATOR WITH SUPPORT SYSTEM AND SOLAR TRACKING

(75) Inventors: Gonzalo Bernabé Peris Domingo, Valencia (ES); Sergio Ehlis Pirretas, Barcelona (ES); Jordi Mulet Mas, Sant Climent de Llobregat (ES); Joan Ignasi Rosell Urrutia, Lleida (ES); Daniel Chemisana Villegas, Lleida (ES)

(73) Assignee: Campania Valenciana De Energias Renovables, S.A., Valencia (ES)

( * ) Notice: Subject to any disclaimer, the term of this patent is extended or adjusted under 35 U.S.C. 154(b) by 384 days.

(21) Appl. No.: 13/816,434

(22) PCT Filed: Aug. 9, 2010

(86) PCT No.: PCT/ES2010/070543
§ 371 (c)(1),
(2), (4) Date: Feb. 11, 2013

(87) PCT Pub. No.: WO2012/020146
PCT Pub. Date: Feb. 16, 2012

(65) Prior Publication Data
US 2013/0139805 A1   Jun. 6, 2013

(51) Int. Cl.
F24J 2/38 (2014.01)
F24J 2/08 (2006.01)
F24J 2/54 (2006.01)
F24J 2/07 (2006.01)

(52) U.S. Cl.
CPC .. *F24J 2/38* (2013.01); *F24J 2/085* (2013.01); *F24J 2/541* (2013.01); *F24J 2002/075* (2013.01); *F24J 2002/5451* (2013.01); *F24J 2002/5493* (2013.01); *Y02E 10/43* (2013.01); *Y02E 10/47* (2013.01)

(58) Field of Classification Search
CPC ............... F24J 2/085; F24J 2/541; F24J 2/38; F24J 2002/075; F24J 2002/5451; Y02E 10/47; Y02E 10/43
See application file for complete search history.

(56) References Cited

U.S. PATENT DOCUMENTS

| 3,868,823 A | 3/1975 | Russell, Jr. et al. |
| 2008/0295825 A1 | 12/2008 | Kleinwachter |

FOREIGN PATENT DOCUMENTS

| CH | 700 099 A2 | 6/2010 |
| DE | 20 2007 017351 U1 | 4/2009 |
| GB | 1590841 * | 6/1981 |
| GB | 1590841 A | 6/1981 |
| WO | WO-2007/087343 A2 | 8/2007 |

OTHER PUBLICATIONS

International Search Report dated Jun. 5, 2011, relating to International Application No. PCT/ES2010/070543.

* cited by examiner

*Primary Examiner* — Alfred Basichas

(57) ABSTRACT

The invention relates to a solar concentrator with a supporting and solar tracking system, which proposes a solar concentrator comprising one or several lenses and one or several collectors and at least two attachment structures (2) for attaching the collector solar and the lens and at least two fastening structures (1) which allow a rotation according to a longitudinal axis. The attachment structure can be rotated or displaced, allowing the displacement of the lens (3) and the collector (4) in opposite directions and the variation of their relative distance, which solves the problem of the variation of the focal distance for each individual angle of incidence of the radiation.

19 Claims, 11 Drawing Sheets

SOLAR CONCENTRATOR WITH SUPPORT SYSTEM AND SOLAR TRACKING

TECHNICAL FIELD

This disclosure is applied to systems for solar collection by refraction and to a system capable of tracking the rays of the sun both depending on the hours of the day and on the season of the year.

BACKGROUND

There are many types of systems for collecting solar energy as well as for concentrating the rays linearly for heating a fluid to a high temperature, which is generally used to produce electricity.

A type of concentrator existing today is the one which uses linear Fresnel lenses for concentrating the rays of the sun on the fluid. The system is basically formed by the lens, a collector which receives the concentrated radiation and the supporting structure and mechanisms. A frequent problem in the existing systems is that if it only tracks the rays of the sun on an axis in an east-west trajectory as the day advances, or north-south for different seasons of the year, this involves a loss of efficiency of the system as it loses concentration in the collection line. This is due to the use of linear concentrating lenses, because the focal point of maximum concentration varies depending on the angle of incidence of the radiation, affecting the efficiency of the installation.

This technical problem has only been solved up until now by means of systems for movement on two axes perpendicular to one another which allow tracking the sun in all its positions, whereby the angle of incidence of the rays of the sun on the lens is always perpendicular with respect to both axes, maintaining the point of maximum concentration invariable, i.e., the focal distance between lens and collector is constant. To achieve high temperature jumps, collectors must be connected in series, and the manner of maximizing efficiency is by placing said collectors forming very long straight lines, and this is not allowed by the two-axes system described above.

Patent WO2007/087343 describes a system which allows movement in both the east-west axis and in the north-south axis to optimize the use of the energy for any angle of incidence. However, the system is based on spheres which rotate about two axes and concentrate the rays individually, which prevents optimizing the efficiency in linear concentrators.

GB 1590841 discloses a solar tracker with refractive based solar energy concentration comprising a movable structure to which one or more linear fluid concentration lenses and one or more mutually parallel linear collectors rigidly interconnected by a structure, are attached. Each of the linear collectors is arranged to capture solar rays concentrated by one of the concentrating linear lenses. This solar tracker also includes drive means operationally connected to pivot this movable structure with respect to a supporting structure about a first longitudinal axis parallel to these linear concentrating lenses and to enable said linear collectors to track a relative movement of the sun (seasonal movement). The lens also is rotatable relative said movable structure about a transversal axis thereof, perpendicular to said first longitudinal axis, to track the sun's hourly movement. A drawback of the proposed solution is that, in spite the lenses can rotate around said transversal axis, the distance between the linear concentrating lenses and the collectors is fixed, so it is not possible to vary it in order to optimize the conditions of solar radiation concentration on said collectors. Moreover the tilting of the lens can not provide an adequate concentration on the collector at different positions.

GB 1590841 provides the features of the preamble of claim 1

US 2008/0295825 discloses a lens system with correction of focal distance for concentration of solar radiation on a collector, providing some means to move a set of linear concentrating lenses towards or away a fixed collector, or to move a collector with regard to stationary concentrating lenses, through a circular oscillating movement (rotation around the center points of a circular disks or rotating bars) of the set of lenses or collector. Such an oscillating circular movement has the drawback that the concentration capacity of the lenses is not used at certain stages of the movement, thus producing shadows.

SUMMARY

This disclosure proposes a solar concentrator provided with at least one linear concentrating lens, and at least one collector, and provided with a supporting and tracking system, wherein the system comprises at least two holding structures adapted for rotating about a first longitudinal axis, and at least two attachment structures for attaching the solar collector or collectors and the lens or lenses, fixed at two points to each holding structure, and capable of rotating with respect to a second transverse axis passing through these two points and perpendicular to the first, such that the plane defined by the attachment structure is inclined with respect to the plane of the holding structure, and wherein the attachment structure is adapted such that it allows the displacement of the lens or lenses and the collector or collectors in opposite directions and the variation of their relative distance.

Particular embodiments are defined in the dependent claims.

As a result of the system of the invention, it is therefore possible to vary the distance between lens and collector, such that the latter is at the point of maximum solar concentration.

BRIEF DESCRIPTION OF THE DRAWINGS

For the purpose of aiding to better understand the features of the invention according to a preferred practical embodiment thereof, a set of drawings is attached to the following description in which the following has been depicted with an illustrative character.

DETAILED DESCRIPTION OF THE INVENTION

Figure 2:
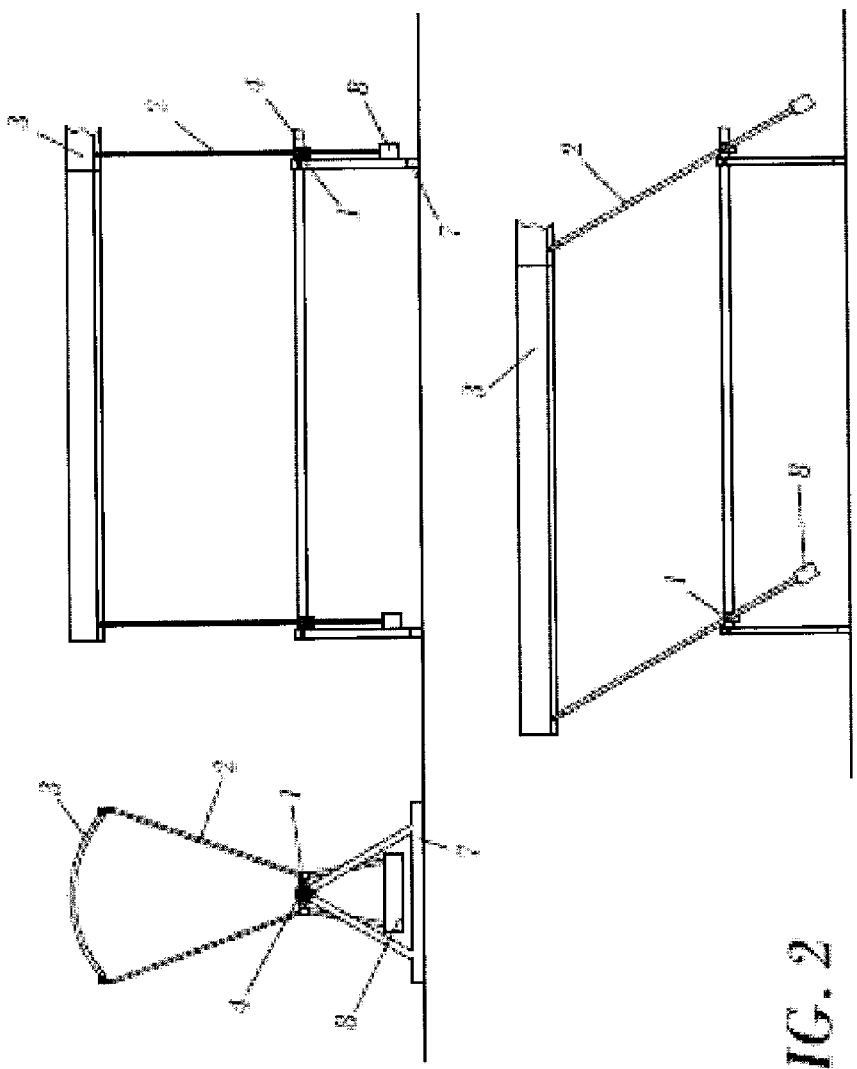
FIG. 2 shows a first embodiment of the invention.
Figure 3:
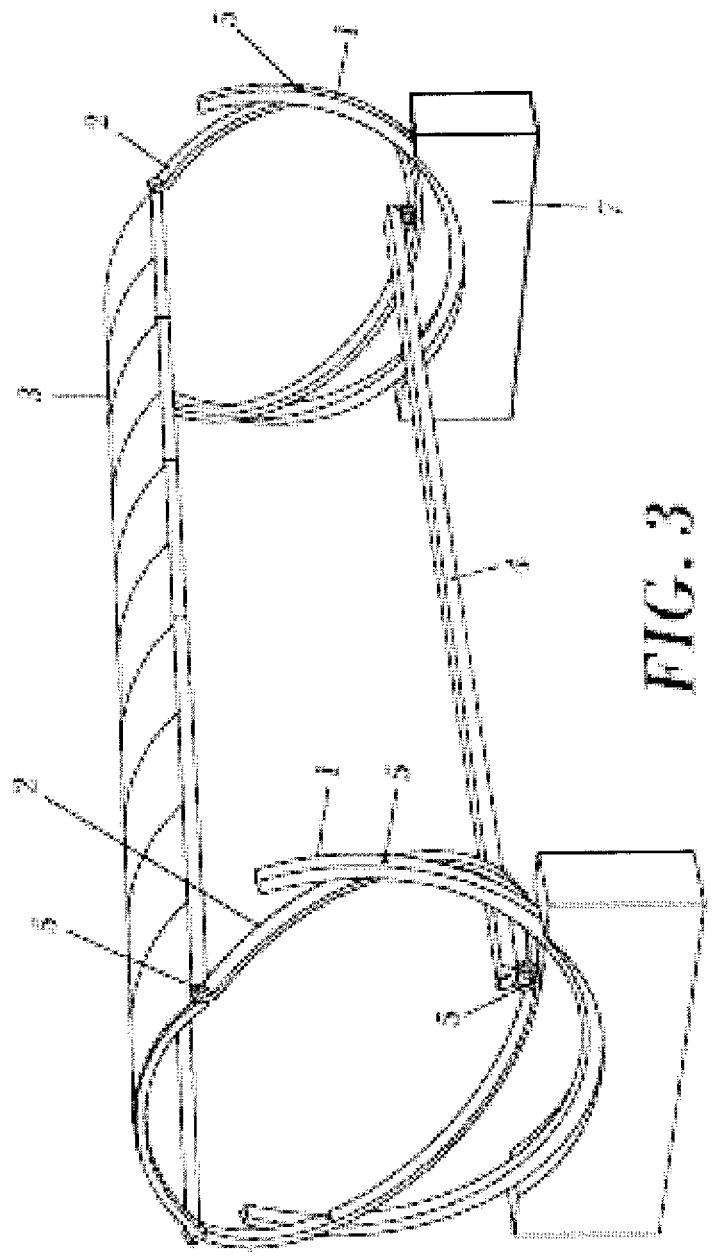
FIG. 3 shows a second embodiment of the invention.

FIGS. 2-3 show systems comprising at least two attachment structures (2) for attaching the solar collector (4) and the lens (3) and at least two holding structures (1). The longitudinal axis of the assembly is defined as that which is parallel to the lens and to its longest edges. The holding structure allows the rotation about the longitudinal axis.

FIG. 2 shows a first embodiment in which the holding structure (1) and the collector (4) are solidary/integral, the longitudinal axis coincides with the axis of the collector and the attachment structure is provided with a counterweight (8).

FIG. 3 shows a system in the configuration with the attachment structure in a circumferential arc shape. In this particular embodiment, the counterweight is not necessary because the axis of rotation of the holding structure is located above the collector. In order to achieve the rotation of the holding structure a rack system could be used (without the invention being limited thereto). The transverse axis is defined as that which passes through the two anchoring points between the holding structure and the attachment structure. The attachment structure can rotate with respect to two points of the holding structure for any position of the latter, such that the plane defined by the attachment structure is inclined with respect to the plane of the holding structure, allowing the longitudinal displacement of the lens and the collector in the opposite direction, further varying their relative distance.

Figure 7:
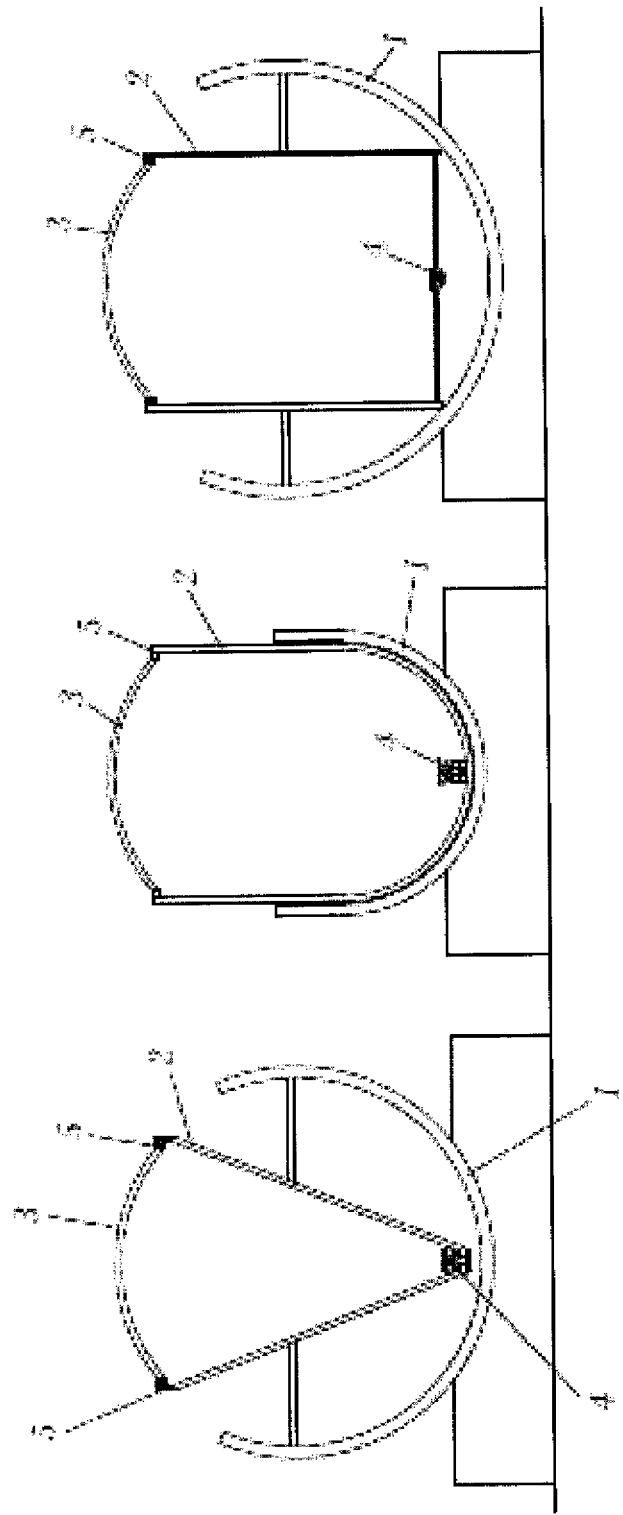
FIG. 7 shows several alternative embodiments of the attachment structure.

The lens-collector attachment structure preferably has a circumferential arc shape which is concentric to the holding structure and fixed thereto with the possibility of rotation about the transverse axis, located approximately at the center of gravity between lens and collector, such that the rotation is balanced. This structure can also have a V shape with straight sections which attach the edges of the lens with the collector, a square shape or a U shape (FIG. 7).

The lens will preferably a Fresnel type lens due to is lower weight and cost. It has further been found that the curved type Fresnel lens offers better features. The lens can alternatively be a spherical type lens. The lens can incorporate a frame about its edges to provide it with rigidity and to facilitate the connection with the attachment structure.

Figure 4:
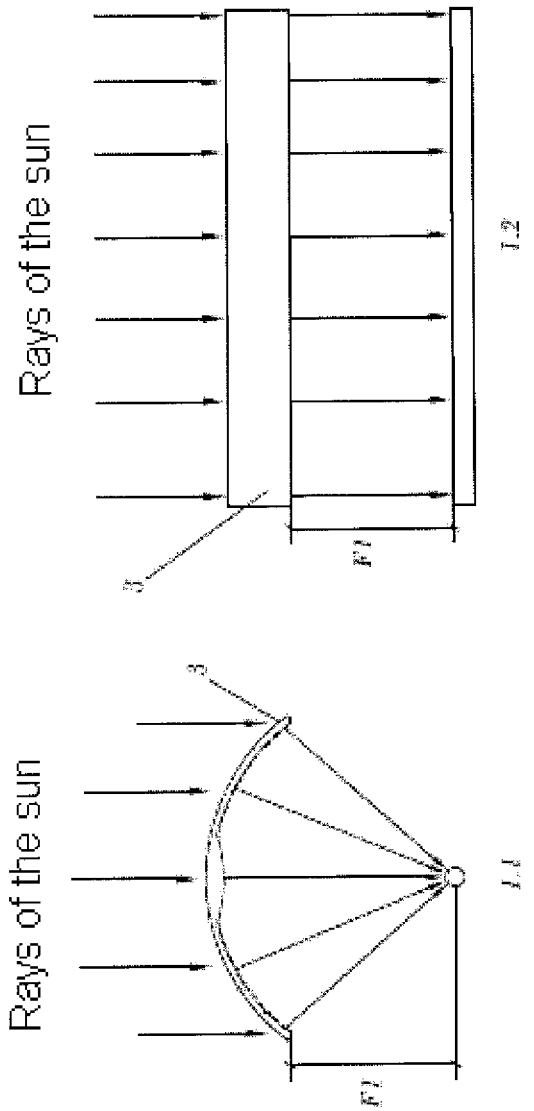
FIG. 4 is a front and cross-sectional view of the Fresnel lens and the collector when the rays of the sun strike perpendicular to the system.
Figure 5:
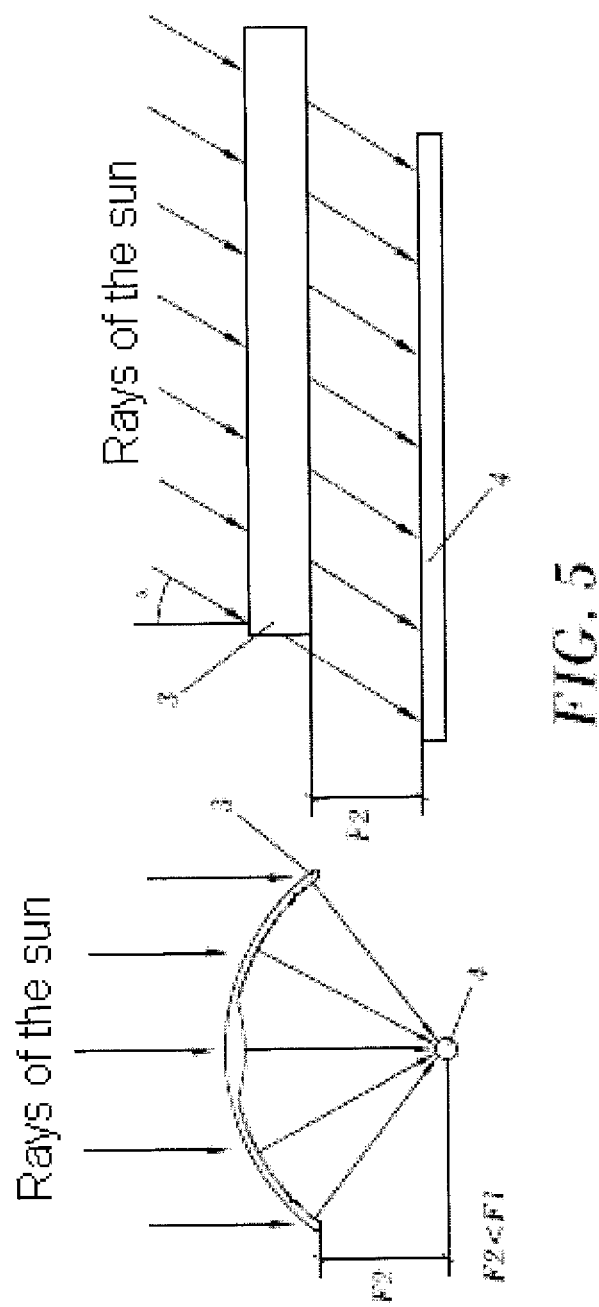
FIG. 5 is a front and cross-sectional view when the rays strike obliquely.

A feature of linear concentrating lenses is, as mentioned, that if the angle of incidence is not normal to the surface, the focal distance (see FIGS. 4 and 5, ref. f1 and f2) measured perpendicular to the surface of the lens varies. Therefore, if the radiation reaching the lens is to be used to its maximum potential, there is no other choice but to vary the distance between lens and collector so that the latter is located at all times in the area of maximum concentration of the rays. This is achieved as a result of the rotation of the attachment structure with respect to the holding structure by means of joints which allow a displacement of up to 75 degrees (friction bearings, for example), and as a result of the fact that the collector and the lens are connected to the attachment structure also by means of joints (5) which allow the position of both elements to remain parallel.

Figure 1:
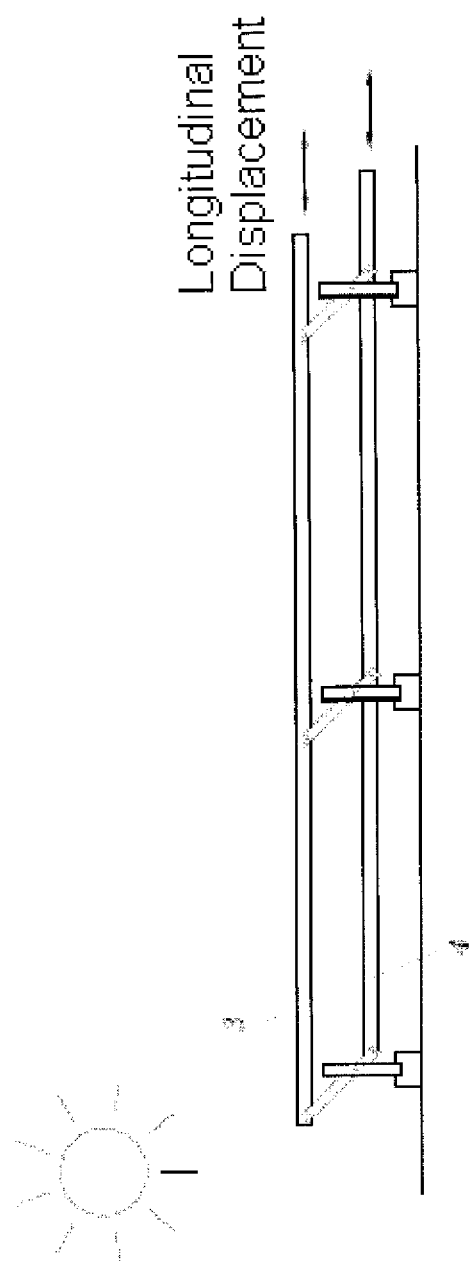
FIG. 1 is a schematic depiction of an embodiment of the invention.

When the angle of incidence of the rays on the lens is not perpendicular with respect to the longitudinal axis, a displacement of the solar spot (area where the radiation is concentrated) towards an end (FIGS. 1 and 5) in the longitudinal direction also occurs. As a result of the invention, this effect is compensated with the displacement of the lens with respect to the collector, thereby achieving that the entire solar spot is projected by the lens and strikes the collector.

As mentioned, the lens and the collector are attached by means of a structure articulated both in the attachment with the lens or its frame and in the attachment with the collector. The distance between the joints is fixed and said joints will allow a longitudinal displacement of the collector and the lens to occur when the attachment structure rotates. Said rotation likewise causes a variation of the distance between lens and collector.

The combination of movements of the two structures allows the lens an infinity of positions with east/west or north/south inclination, and positions of the lens closer to or farther away from the axis of rotation of the attachment structure. By means of the rotation of the holding structure on the longitudinal axis, the angle of incidence of the rays of the sun is always perpendicular to the transverse axis. By means of the rotation of the attachment structure on the transverse axis, the distance between lens and collector is located at the point of maximum concentration of the rays of the sun.

The lens will thus always move in the direction opposite the collector, varying its relative longitudinal position and its distance in the normal direction, but never its relative transverse position.

Figure 8:
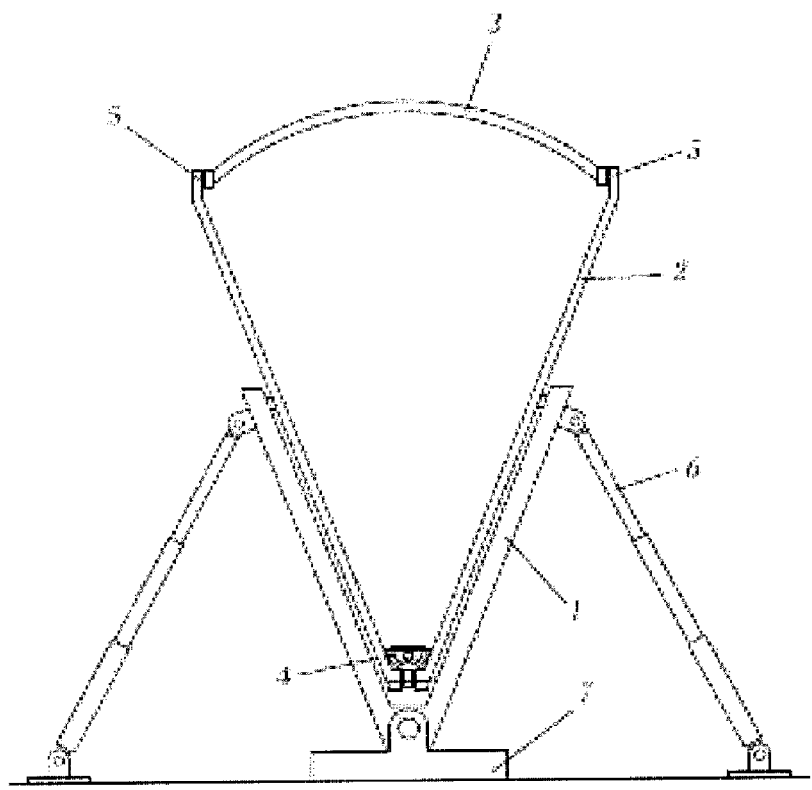
FIG. 8 shows an alternative form of the attachment and holding structures.

An alternative embodiment is shown in FIG. 8, in which both the attachment structure (2) and the holding structure (1) have a V shape. The holding structure (1) can rotate about a longitudinal axis, which in this case passes through its vertex. The rotation of the attachment structure and the relative movement of the lens and the collector occur similarly to the previous examples. To assure the stability of the system, the latter is provided with telescopic supports (6) which, upon varying in length, make the holding structure be inclined towards one side or the other about the longitudinal axis. These telescopic systems can be hydraulic or electric, or function by means of a rack or "worm screw" system.

Figure 9A:
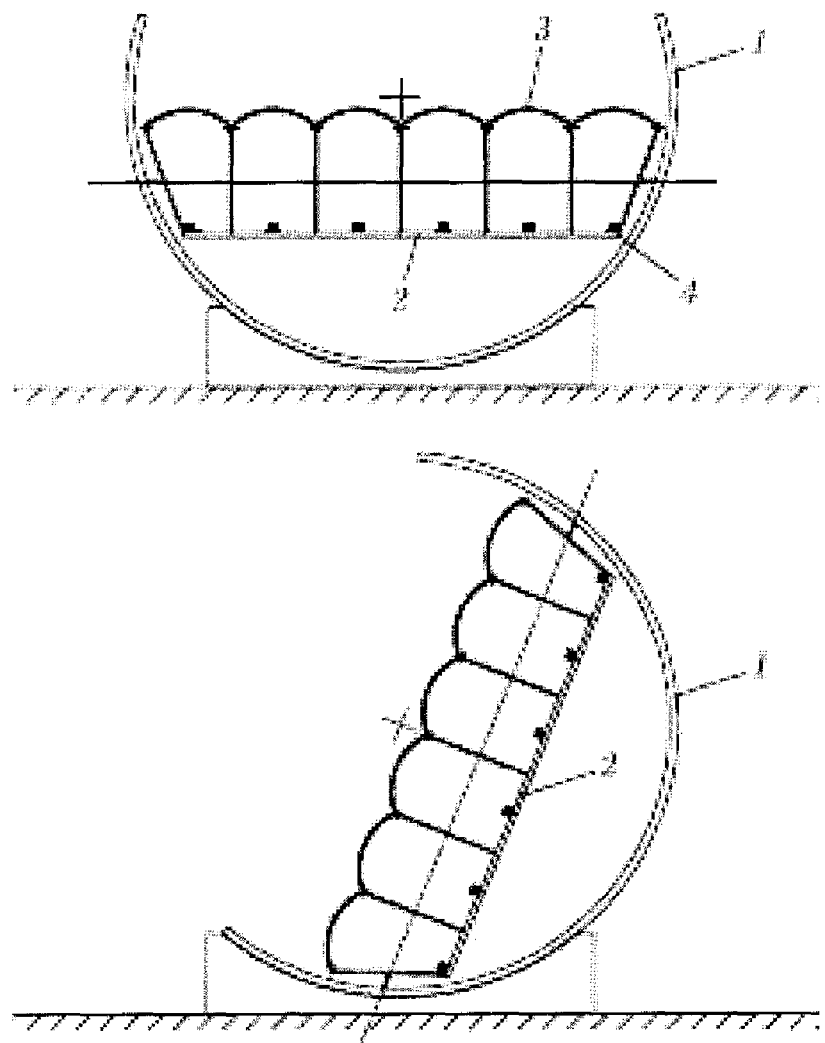
FIGS. 9A, 9B and 9C are other particular embodiments adapted for the use of several lenses and collectors in parallel.
Figure 9B:
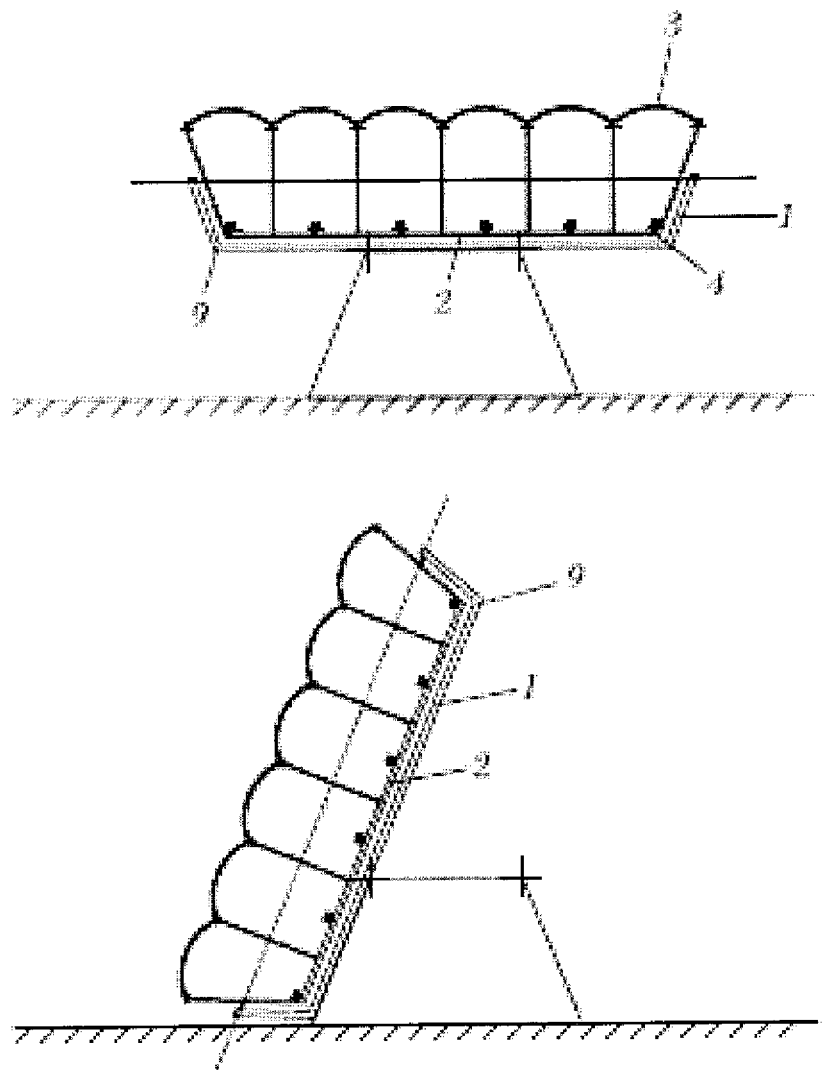
Figure 9C:
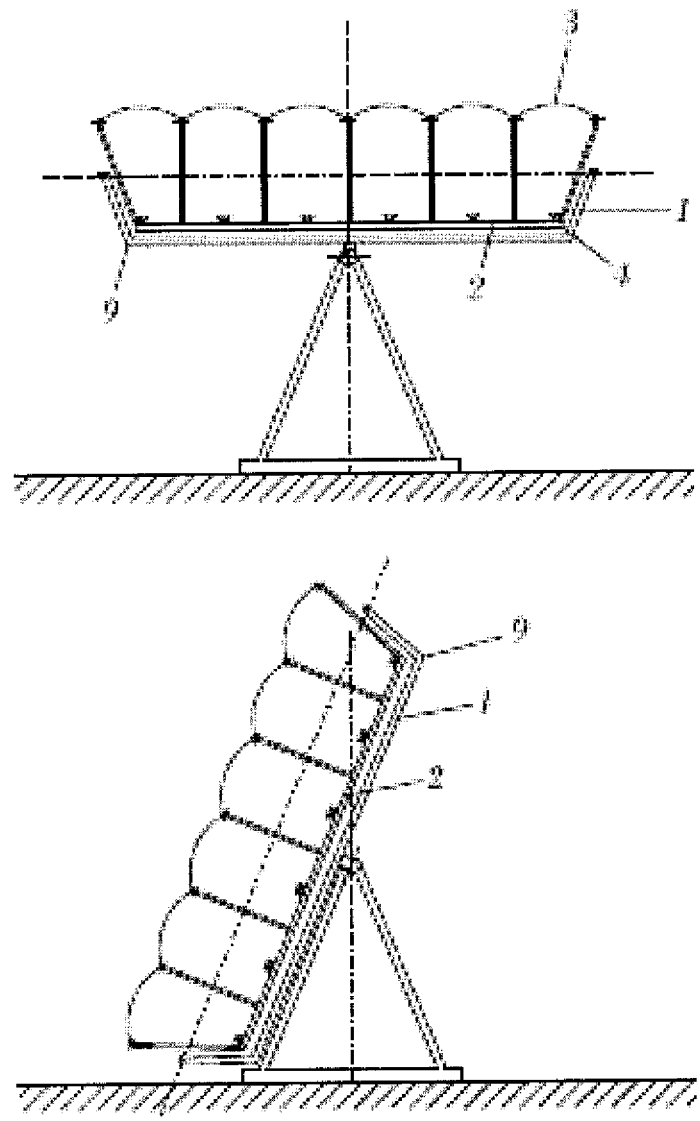

In other particular embodiments, which can be seen in FIGS. 9A, 9B and 9C, the attachment structure would have a saw or boat shape, such that it can house several collectors and several lenses in parallel. This system has the advantage that the proportions are flatter, i.e., the height of the assembly is less with respect to the width, gaining in stability. For this embodiment, two different types of holding structure are contemplated: the first one (FIG. 9A) is the one previously described (FIG. 3) and the second one (FIGS. 9B and 9C) is in a boat shape, i.e., formed by a horizontal section in the base or rest position to place the collectors and two vertical or inclined sections at the ends. Said structure therefore has two vertices (9). For the case of FIG. 9B, the longitudinal axis is located between the vertex of one side and the axis of symmetry when the assembly rotates towards that side or between the vertex of the other side and the axis of symmetry when the assembly rotates towards that other side. The base structure of this latter embodiment is a platform or pedestal, preferably made of reinforced concrete. The system of FIG. 9C is a particular case of the 9B in which the longitudinal axis always remains fixed in the axis of symmetry.

The operation of the rotation of the holding structure for the cases described in FIGS. 9B and 9C will preferably be done by means of telescopic supports which, upon varying in length, make the holding structure be inclined towards one side or another about a longitudinal axis. These telescopic systems can be hydraulic or electric and function by means of a rack or "worm screw" system. Another type of operation is by means of a motor with a fixed reducer acting on the axis of rotation.

Examples of materials for the different elements of the supporting system are: steel for the holding and attachment structures, and they can also be made of aluminum or thermoplastic and reinforced steel and metal for the base structure.

Preferred Embodiment

Figure 6:
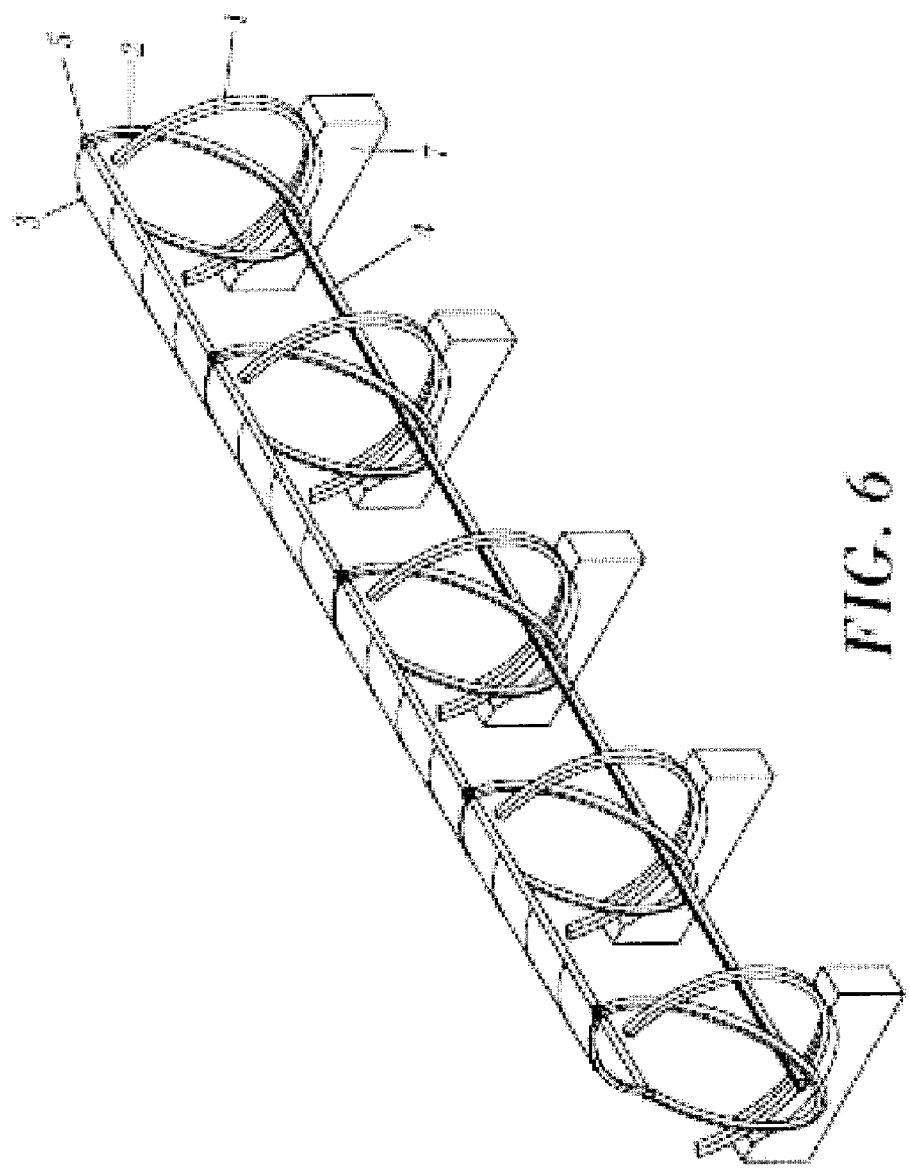
FIG. 6 shows several systems mounted contiguously for their installation in a thermal solar facility.

In a preferred embodiment, the collection systems can be mounted continuously in the north-south direction to form modules. Each module is defined as an assembly of systems which share operation (FIG. 6).

The east-west movement for the preferred embodiment of the holding structure occurs about an imaginary axis parallel to the lens (longitudinal axis) and located approximately at the center of gravity of the assembly, such that it is a balanced rotation.

A loop will be formed by an assembly of modules attached in series to achieve a determined temperature jump. The system is formed by a Fresnel lens which can be formed by several parts, a collector and two base structure, holding structure and attachment structure assemblies. Upon attaching several successive systems, every two systems share a base, holding and attachment structures assembly (FIG. 6).

The attachment between the base structure (7) and the holding structure can mainly be of two types: a circular guide by means of rollers which allow the displacement between structure and guide, always keeping the axis of the circle of the structure (longitudinal axis) in the same position, and with rollers or stops which do not allow other movement or the separation of the structure with respect to the guide, or a horizontal flat guide, the holding structure being displaced like a wheel on the surface.

In both cases the base (7) is preferably formed of pieces of concrete fixed to the ground by means of sole plates. Said pieces would have a parallelepiped shape with a recess in the form of a circular sector in the upper face for the first case explained above, and a parallelepiped shape with continuous faces in the second case.

The pieces of concrete would be completed with the necessary guides and elements which only allow the rotational movement, preventing lateral displacements and uplifting.

The invention claimed is:

1. A solar concentrator comprising:
   at least one linear concentrating lens;
   at least one solar collector; and
   a supporting and tracking system comprising at least two holding structures adapted for rotating about a longitudinal axis to track the sun's hourly movement and at least two attachment structures for attaching to its ends the at least one solar collector and the at least one linear concentrator lens and retaining them in parallel,
   wherein each one of the at least two attachment structures being rotatably fixed at two opposite points to one of the at least two holding structures and capable of rotating with respect to a transverse axis passing through these two opposite points and perpendicular to the longitudinal axis,
   such that when the at least two attachment structures rotate around the traverse axis, the at least one lens and the at least one collector move in opposite and parallel directions thereby causing a variation of the distance between the at least one lens and the at least one solar collector.

2. A solar concentrator according to claim 1, wherein each one of the at least two attachment structures has joints in the points of attachment with the at least one collector, the at least one lens and the at least two holding structures.

3. A solar concentrator according to claim 2, further comprising:
   a frame to provide support to the at least one lens and attach said at least one lens to the attachment structure through the joints.

4. A solar concentrator according to claim 3, wherein the attachment structure and the holding structure have a circumferential arc shape and the longitudinal axis is parallel to the axis of the collector.

5. A solar concentrator according to claim 3, wherein the attachment structure has a rectangular, V or U shape, the holding structure has a circumferential arc shape and the longitudinal axis is parallel to the axis of the collector.

6. A solar concentrator according to claim 3, wherein the at least one lens comprises at least two lenses, and wherein the at least one collector comprises at least two collectors, and wherein the attachment structure has a boat or saw shape.

7. A solar concentrator according to claim 3, wherein the lens is a linear Fresnel or spherical-type lens.

8. A solar concentrator according to claim 2 wherein the attachment structure and the holding structure have a circumferential arc shape and the longitudinal axis is parallel to the axis of the collector.

9. A solar concentrator according to claim 2, wherein the attachment structure has a rectangular, V or U shape, the holding structure has a circumferential arc shape and the longitudinal axis is parallel to the axis of the collector.

10. A solar concentrator according to claim 2, wherein the at least one lens comprises at least two lenses, and wherein the at least one collector comprises at least two collectors, and wherein the attachment structure has a boat or saw shape.

11. A solar concentrator according to claim 2, wherein the lens is a linear Fresnel or spherical-type lens.

12. A solar concentrator according to claim 1, wherein the concentrator includes a single collector and a single lens, and wherein the holding structure and the collector are integral, and wherein the longitudinal axis coincides with the axis of the collector and the attachment structure is provided with a counterweight.

13. A solar concentrator according to claim 12, wherein the lens is a linear Fresnel or spherical-type lens.

14. A solar concentrator according to claim 1, wherein the attachment structure and the holding structure have a circumferential arc shape and the longitudinal axis is parallel to the axis of the collector.

15. A solar concentrator according to claim 1, wherein the attachment structure has a rectangular, V or U shape, the holding structure has a circumferential arc shape and the longitudinal axis is parallel to the axis of the collector.

16. A solar concentrator according to claim 1, wherein the at least one lens comprises at least two lenses, and wherein the at least one collector comprises at least two collectors, and wherein the attachment structure has a boat or saw shape.

17. A solar concentrator according to claim 16, wherein the holding structure has a boat shape, and wherein the longitudinal axis is between a vertex and the axis of symmetry of the concentrator.

18. A solar concentrator according to claim 16, wherein the holding structure has a boat shape, and wherein the longitudinal axis of rotation coincides with the axis of symmetry of the concentrator.

19. A solar concentrator according to claim 1, wherein the lens is a linear Fresnel or spherical-type lens.

* * * * *

UNITED STATES PATENT AND TRADEMARK OFFICE
CERTIFICATE OF CORRECTION

PATENT NO. : 9,239,172 B2
APPLICATION NO. : 13/816434
DATED : January 19, 2016
INVENTOR(S) : Gonzalo Bernabé Peris Domingo et al.

It is certified that error appears in the above-identified patent and that said Letters Patent is hereby corrected as shown below:

On the title page item (73), delete the word "Campania" in the Assignee name and insert
-- Compania --.

Signed and Sealed this
Fourteenth Day of June, 2016

Michelle K. Lee
*Director of the United States Patent and Trademark Office*